United States Patent Office 3,357,934
Patented Dec. 12, 1967

3,357,934
ORGANO-SILICA AEROGEL DEFLOCCULENT
FOR AQUEOUS MEDIUMS
Ralph Marotta and Harry Teicher, St. Louis, Mo., assignors to Monsanto Company, St. Louis, Mo., a corporation of Delaware
No Drawing. Filed July 7, 1964, Ser. No. 380,948
6 Claims. (Cl. 260—17)

ABSTRACT OF THE DISCLOSURE

The present invention provides film forming compositions comprising an aqueous medium having dispersed therein particles of a finely divided, water insoluble organic polymer (for example, styrene-butadiene copolymer) and from about 0.2% to about 2% by weight, based upon the weight of the composition, which amount is sufficient to maintain the polymer in a dispersed state (during and after the application of said composition to a surface to form a film) of particles of a finely divided amorphous organo-silica aerogel comprising a silica polymer having soloxy groups and containing carbon and hydrogen atoms chemically bound to a portion of the siloxy groups in the aerogel. Such aerogels are further characterized in having an $SiO_2$ to carbon atom ratio of from about 10:1 to about 50:1 and an $SiO_2$ to hydrogen atom ratio of from about 0.77:1 to about 2:1. The film forming compositions are characterized by the property that the organic polymer particles, alone or in combination with pigment particles, suspended therein, do not materially agglomerate or flocculate into larger particles due to the presence of the organo-silica aerogel therein. This invention also provides processes for preparing the aforementioned compositions, which processes generally comprise the steps of intimately admixing the foregoing organo-silica aerogel with a finely divided water insoluble organic polymer dispersed in water, alone or in combination with divided pigment, to form such coating composition.

The present invention relates to novel water based film forming and/or coating compositions comprising dispersions of polymers in aqueous media. The invention more particularly relates to novel film forming or coating compositions comprising dispersions of finely divided, water insoluble organic polymer particles, and/or such polymer particles and finely divided pigments, in aqueous media. The present invention also relates to novel liquid water based coating compositions (usually, when pigmented, referred to as latex paints) in which there is incorporated a finely divided, hereinafter defined, organo-silica aerogel and in which the polymer and pigment particles remain uniformly dispersed during and after the application of the liquid composition to a surface to form a film. In other words the polymer and pigment particles of the compositions of this invention to do not flocculate or agglomerate to any substantial extent during the drying of the film or coating. The present invention further relates to processes for preparing such film forming and/or coating compositions.

Water based film forming or coating compositions such as, for example, latex coating compositions are well known commercially and have been used with increasing frequency for interior decorative coatings and external protective or preservative coatings. These known commercial coating compositions, when transparent, usually consist of an aqueous medium in which there is dispersed (1) finely divided particles of water insoluble synthetic or natural organic polymers and (2) one or more water dispersible thickening agents such as methylcellulose, carboxylmethylcellulose and the like to provide an optimum viscosity of the composition thus enabling its ready application to surfaces to form films. Such compositions, when opaque, contain in addition to a finely divided polymer and thickening agent (3) a finely divided organic or inorganic pigment and also often contain (4) an inert finely divided filler or pigment extender. Compositions containing the above four major ingredients usually also contain a wetting or emulsifying agent and are commonly referred to as latex paints. Such known water based film forming compositions have certain recognized advantages over non-aqueous or solvent (e.g. oil based) film forming or coating compositions or paints and these advantages have resulted in the increasing popularity of such water based products.

However, the water based film forming compositions also have a number of disadvantages one of the more important being that when the compositions are applied to surfaces to form films or coatings the dispersed particles of the polymer and/or pigment in the compositions tend to agglomerate or flocculate to form larger masses or particles almost immediately after the application of the composition to surfaces. This agglomeration and/or flocculation continues during the drying of the film or coating. Such agglomeration or flocculation in the wet film results in dried coatings in which both the polymer film and the pigment are often non-uniformly dispersed in the form of relatively large particles and the resultant coating is uneven with respect to thickness and color uniformity (in the case of pigmented compositions) and also uneven with respect to the degree of surface protection normally expected to be afforded by the polymer (and/or the mixture of pigment and polymer) in dried film or coating.

The tendency of the particles dispersed in aqueous or water based film forming compositions to agglomerate or flocculate is further aggravated by the inclusion in such compositions of thickening agents, fillers and/or pigment extenders. Although many attempts have been made in the past to overcome the tendency to flocculate or agglomerate such attempts have at best been only partially successful.

It has been proposed heretofore in U.S. Patent 2,597,872 issued May 27, 1952, to Ralph K. Iler to add alkali stabilized colloidal silica sols to water based paints to improve the adhesion of the dried coating formed from the paint when applied to a surface. It has also been proposed heretofore in U.S. Patent 2,857,355 issued Oct. 21, 1958, to Ralph K. Iler to add hydrophobic organic esters of silicic acid to organic solvent based coating compositions to provide flatting effects and improved hardness and durability of the coating.

However, the incorporation of aqueous silica sols in water based latex film forming compositions and paints and the incorporation of hydrophobic organic silicic acid esters in water based coating compositions do not prevent, to any substantial extent, the agglomeration and/or flocculation of polymer and pigment particles during and after the application of the coating compositions to surfaces to form films. The novel compositions and processes of the present invention substantially overcome the above mentioned disadvantages.

It is one object of the present invention to provide water based film forming compositions containing finely divided particles of an organic polymer in which the particles will not flocculate or agglomerate to any substantial extent during and after the application of the composition to a surface to form a film.

It is a further object of the present invention to provide novel water based film forming or coating compositions having the above properties and which have incorporated therein a minor amount of a hereinafter defined organo-silica aerogel.

It is a still further object of this invention to provide processes for preparing these compositions.

Still further objects and advantages of the present invention will become apparent from the following description and the appended claims.

In accordance with the present invention there is provided novel, film forming or coating compositions in the form of water based pigmented and non-pigmented products which provide uniform films and in which the finely divided polymer particles and finely divided pigment particles do not agglomerate or flocculate to any substantial extent during or after the application of the compositions to surfaces.

It has presently been discovered that the incorporation of small amounts of finely divided, hereinafter defined, organo-silica aerogels in pigmented and non-pigmented water based latex film forming formulations will result in coating compositions in which the polymer and/or pigment particles do not agglomerate or flocculate and do not to any substantial extent form larger particles during or after the application of the compositions to surfaces to form films. The films and/or coatings provided by such formulations are superior in that the formulations exhibit a better and more uniform spreadability during application and result in dried coatings having a more uniform thickness and composition which provide better protection to coated surfaces than in the case of coatings formed from previously known compositions which form coatings containing agglomerated particles.

The present invention provides novel film forming compositions comprising an aqueous medium having dispersed therein a finely divided, water insoluble organic polymer and an amount sufficient to maintain the polymer in a dispersed state, during and after the application of said composition to a surface to form a film, of a finely divided amorphous organo-silica aerogel comprising a silica polymer having siloxy groups and containing carbon and hydrogen atoms chemically bound to a portion of the siloxy groups in the aerogel. Such aerogels are further characterized in having an $SiO_2$ to carbon atom ratio of from about 10:1 to about 50:1 and an $SiO_2$ to hydrogen atom ratio of from about 0.77:1 to about 2:1. The above-described organo-silica aerogels also usually contain, in chemically combined form in the aerogel, from about 0.4% to about 1.2% by weight of carbon and from about 0.9% to about 1.5% by weight of hydrogen.

The finely divided organo-silica aerogels which are advantageously employed in the compositions of this invention are also characterized in having a specific surface area of from about 100 to about 400 square meters per gram, a total pore volume of from about 600 to about 800 milliliters per gram, an average pore radius of between about 100 and 200 angstroms, an average particle size in the range of from about 1.0 to about 2.5 microns, a particle size distribution in the range of from about 0.5 to slightly less than 6.0 microns and an external surface area of from about 1.70 to about 1.95 square meters per gram.

Two distinct but inter-related classes of finely divided hydrophilic amorphous organo-silica aerogels having at least the $SiO_2$ to carbon atom hydrogen atom ratios and specific surface areas within the ranges described in the preceding paragraph may be employed in compositions of this invention.

One class of amorphous finely divided hydrophilic organo-silica aerogels which may be employed comprises a silica polymer having siloxy groups and containing carbon and hydrogen atoms chemically bound to a portion of the siloxy groups in the aerogel and are characterized in having an $SiO_2$ to carbon atom ratio of from about 25:1 to about 50:1 and an $SiO_2$ to hydrogen atom ratio of from about 1.3:1 to about 2:1. Such organo-silica aerogels contain from about 0.4 to about 0.8% by weight of carbon and from about 0.9 to about 1.2% by weight of hydrogen.

Another and a preferred class of finely divided hydrophilic amorphous organo-silica aerogels which may be employed in the compositions of this invention comprise a silica polymer having siloxy groups and containing carbon and hydrogen atoms chemically bound to a portion of the siloxy groups in the aerogel and are further characterized in having an $SiO_2$ to carbon atom ratio of from about 10:1 to about 25:1 and an $SiO_2$ to hydrogen atom ratio of from about 0.77:1 to about 1.3:1. Such aerogels usually contain from about 0.9% to about 1.2% by weight of carbon and from about 1.2% to about 1.5% by weight of hydrogen.

As noted hereinbefore the hydrophilic organo-silica aerogels employed have the above described chemical and physical properties and have an average particle size in the range of from about 1.0 to about 2.5 microns.

Such finely divided organo-silica aerogels are preferably composed of particles having a particle size distribution in the range of from about 0.5 to slightly less than 6.0 microns. The particle size distribution of the particles of the finely divided organo-silica aerogels is preferably such that from about 20% to about 30% of the particles have a particle size of between about 0.5 and 1.0 microns, about 20% to about 30% of the particles have a particle size in the range of about 1.0 to about 2.0 microns, about 40% to about 60% of the particles have a particle size in the range of about 2.0 to about 4.0 microns and from about 3% to about 8% of the particles have a particle size greater than 4.0 microns but less than 6.0 microns. As stated hereinbefore such finely divided hydrophilic amorphous organo-silica aerogels are characterized in having carbon and hydrogen atoms bound to a portion of the siloxy groups in the aerogel. Although it is not known with certainty how the carbon atoms are bound to the siloxy groups it is believed that the following general types of chemical bonding exists at least to some extent in the organo-silica aerogels.

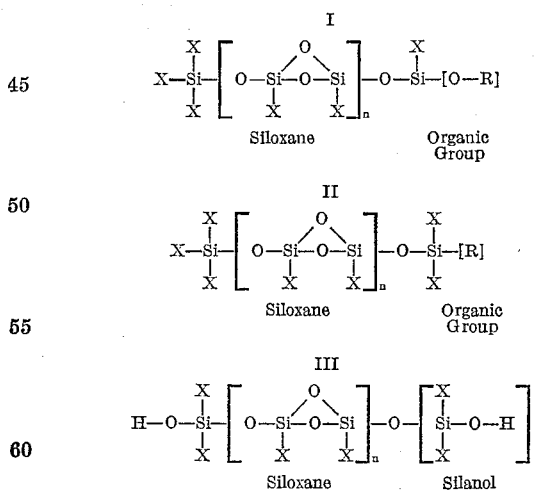

In Formulae I and II, R is an organic group or radical, usually a hydrocarbon group, and, preferably an alkyl group such as, for example, a methyl, ethyl or a propyl group, and X may represent a silica polymer, an organo-substituted silica polymer, an organic group as represented in Formulae I and II, or a silanol group as represented in Formula III. In these formulae, n is a whole number greater than 1.

The amount of finely divided organo-silica aerogels which may be employed in the film forming compositions of this invention may vary considerably and depends to some extent upon the amount of polymer particles dispersed in the aqueous medium and the amount of finely divided pigment dispersed therein. Generally, however, such organo-silica aerogels will be employed in the range of from about 0.2% to about 2.0%, preferably from about 0.4% to about 1.0% by weight, based on the weight of the compositions.

If less than about 0.2% by weight of organo-silica aerogel is employed the finely divided polymer and pigment particles will often not be entirely prevented from flocculating or agglomerating resulting in the non-uniform dried coatings hereinbefore described. If more than about 2.0% by weight of the organo-silica is employed the compositions will often tend to thicken and have a consistency such that difficulty is often encountered in the application of the compositions to a surface or alternatively and undesirably thick coating may result.

The finely divided organic polymer which may be dispersed in the film forming compositions of this invention may be any organic plastic polymer but is preferably a copolymer or interpolymer commonly employed in known latex coating compositions. The term "plastic" is used herein in its usual and ordinary meaning as defined in Modern Plastics Encyclopedia, 1950 edition, at page 30 as follows: "A plastic is any one of a large and varied group of materials which consists of or contains as an essential ingredient an organic substance of a large molecular weight, and which, while solid in the finished state, at some stage in its manufacture has been or can be formed (cast, calendered, moulded, etc.) into various shapes by flow—usually through the application, singly or together, of heat and pressure."

Included as organic polymers is that special class of substances known as "elastomers." An elastomer as also defined at the above mentioned page 30 of the Modern Plastics Encyclopedia is "a material which at room temperature can be stretched repeatedly to at least twice its original length and upon immediate release of the stress will return with force to its approximate original length."

Examples of organic polymers or resins which may be employed include finely divided phenolic resins such as phenol formaldehyde or terpenephenol, examples of other resins include resorcinol-formaldehyde resins, urea-formaldehyde resins, phenol - resorcinol - formaldehyde resins and phenol-furfural resins. Other resins or polymers include finely divided melamine resins such as urea modified melamines and co-condensation products of melamine-formaldehyde resins and diglycol carbamate. Still other finely divided organic polymers include finely divided ester resins such as the copolymers of diallyl phenol phosphonate with monomers such as methyl methacrylate, vinyl acetate, diallyl phthalate, diallyl succinate, diallyl oxalate, and unsaturated alkyd resin mixtures. Still other orgnic polymers which may be used include finely divided products prepared by the polymerization of phthalic anhydride, maleic anhydride or sebacic acid or other high molecular weight polybasic acid with a polyhydric alcohol such as glycerol, the glycols, pentaerythritol, or sorbitol.

Finely divided acrylic resins including polymeric methyl methacrylate and related polymers such as cyclohexyl methacrylate may also be employed. Other finely divided organic polymers include vinyl polymers and copolymers such as polyvinyl chloride, polyvinyl acetate, polyvinyl chloride acetate, vinyl chloride-vinylidene chloride polymers and polyvinyl acetals. Other polymers include polyethylene polymers and styrene polymers and copolymers including mixtures of polystyrene and chlorinated diphenyl, butadiene styrene copolymers, styrene-isobutylene copolymers of maleic anhydride and styrene. Examples of finely divided elastomeric polymers include natural rubbers such as caoutchouc and synthetic rubbers and rubber like materials such as neoprene, butyl rubber, styrene-butadiene copolymers may also be employed. Advantageous elastomers (sometimes known as latices) which may be employed in finely divided form in compositions of this invention include: butadiene copolymerized in various ratios with styrene, butadiene copolymerized in various ratios with acrylonitrile, polymerized butadiene, polymerized 2,3-dimethyl butadiene, polymerized 2-chlorobutadiene, 1,3-isobutylene copolymerized with isoprene, copolymers of butadiene and methyl methacrylate, butadiene copolymerized with methylvinyl ketone, and various other copolymers of butadiene with ethylenic unsaturated hydrocarbons. Generally, finely divided diene elastomeric polymers as a class are commonly employed in aqueous latex film forming compositions.

Other finely divided emulsion or elastomeric polymers include cyclo rubbers prepared by the action of chlorostannic acid on natural or synthetic rubbers. Also finely divided elastomers including multiple sulfur linkages such as the "Thiokol" types may be employed.

Finely divided organic polymers which differ somewhat from the above defined polymers but which may be also employed include finely divided naturally occurring polymers such as water insoluble starch, natural gum resins such as shellac, copol gum (including Manila gum) rosin and terpenes. It should be noted that in their lower degrees of polymerization some of these organic polymers are somewhat water soluble. However, the finely divided polymers which are usually employed in film forming compositions of the type contemplated herein generally have a molecular weight in excess of 10,000 and are substantially water insoluble.

The amount of finely divided polymers employed may vary widely depending upon the end use application intended and also depending to some extent on the particle size and particle size range of the polymer particles. However, the amount of such polymers is usually within the range of polymers, copolymers or interpolymers present in latex paints. Another factor influencing the amount of finely divided polymer is the kind and amount of pigment when employed. Generally, the amount of polymer particles in the compositions will be in the range of from about 5% to about 25% by weight preferably from about 8% to about 16% by weight, the lower quantities corresponding to the absence of or smaller amounts of pigment which it is desired to use. If less than 20% by weight of pigment particles are employed an unsatisfactorily thin and often softer coating will be obtained. If more than about 25% by weight of finely divided organic polymer is employed, in addition to economic disadvantages the resultant coating formed when the composition is applied to a surface will be undesirably thick.

As noted hereinbefore the finely divided polymer, copolymer or interpolymer latex particles present in the compositions of this invention comprise dispersions of low molecular weight copolymers herein defined which may vary considerably with respect to particle size. Such finely divided organic polymers when employed in latex paints desirably have a particle size in the range of from about 50 to about 8000 angstroms, preferably from about 1000 to about 5000 angstroms.

The compositions containing the polymer particles usually contain an anionic dispersing agent.

The pigments present in the compositions of this invention may be any of a wide variety of inorganic and organic water insoluble materials known and commonly employed in water based compositions or paints. Examples include titanium dioxide, clay, zinc oxide, iron oxide, sulfur, aluminum oxide, carbon black, magnesium oxide, calcium carbonate and the like. Examples of organic pigments include phthalocyanine pigments such as copper or mixed tin and copper salt of phthalocyanine referred to as phthalocyanine blue and a chlorinated copper phthalocyanine salt referred to as phthalocyanine green. Other examples of organic pigments include insoluble azo pigments such as benzidine yellows which are products or couplings between dichlorobenzidine and acetoacetic arylides such as acetoacetic-anilide, -ortho toluidide, -xylidide, -para chloroanalide and -ortho chloro-analide;

benzidine orange which is a coupling product of dichlorobenzidine with pyrazolone substitution products such as methyl phenyl pyrozolone; hansa yellows which are acetoacetic arylide couplings with substituted analines, like 4-chloro-2-nitroaniline or orthonitraniline amongst others. Examples of other insoluble azo pigments include the azo red which are coupling products of the Naphthol AS type compounds of beta-ortho-naphthoic acid such as Naphthol AS, Naphthol AS–BS, with fast color salts such as 2,5-dichloroaniline, paranitro-orthotoluidine, paranitro-orthoanisidine and the like.

Other pigments which may be present are those of the indigoid or anthraquinone type and are commonly referred to as vat pigments including thioindigo derivatives and derivatives of flavanthrene, benzanthrone and complex structures formed by the condensation of benzanthrone molecules. Structural formulas of vat pigments which are often present in the coating compositions contemplated by this invention include those listed on pages 429–435 of volume V of Mattiello: Protective and Decorative Coatings, John Wiley & Sons, Inc., New York, 1946.

The amount of pigment which may be present in the film forming compositions of this invention will vary considerably depending upon the nature of the pigment and whether the pigment is for interior or decorative purposes or is expected to contribute to the protective properties of the protective coating formed. Thus for example when an inorganic pigment such as $TiO_2$ or lead sulfate is employed larger quanties of such pigment will be used since these finely divided particles are expected to provide protective properties in the finished coating. On the other hand where the pigment employed is pigment which is not expected to contribute protective properties to be finished coating but is included primarily for decorative purposes the amount of such pigment will be usually such as to provide the desired color in the finished coating. Usually the amount of pigment employed is based on the polymer and is in a polymer to pigment ratio of between about 1:20 to about 20:1.

As noted hereinbefore the aqueous medium in which this finely divided water insoluble organic polymers, finely divided water insoluble inorganic or organic pigments are dispersed usually also contains emulsifying or wetting agents which are usually anionic detergents. Examples of such detergents include fatty alcohol sulfates, such as sodium, ammonium or triethanolamine salts of sulfates of lauryl alcohol, cetyl alcohol, oleyl alcohol and their mixtures. These agents are known in the art as emusifying and dispersing agents. Examples of commercial products are Duponol ME, which is a dry powder form of sodium lauryl sulfate and Duponol WA paste which is a water paste of the same compound containing 30% active ingredient and some inorganic impurities. Other emulsifying or dispersing agents include sodium alkyl naphthalene sulfonates such as the isopropyl naphthalene sulfonate and the isobutyl naphthalene sulfonate and the sodium dodecyl benzene sulfonate.

The thickening agents which may be employed are those commonly used in water based latex paints and function in controlling the viscosity of the film forming composition thus enabling it to be applied in a film of controllable thickness. Such thickening agents also tend to prevent the settling of finely divided polymer pigment from the aqueous medium during storage. However, as previously noted these commonly employed thickeners which are water dispersible usually tend to cause or to promote the agglomeration or flocculation of the polymer and pigment particles of the composition during and after the application of the composition to a surface to form a film. The compositions of the present invention generally require less thickening agent since the inclusion of the finely divided organo-silica aerogel therein also tends to increase advantageously the viscosity, e.g. tends to act as a thickener, and also prevents agglomeration or flocculation of the particles of the composition whether a known thickening agent is used or whether such agent is not used.

Due to the aforementioned prevention of agglomeration or flocculation of the compositions of this invention it has also generally been found possible to employ significantly less finely divided polymer and significantly less pigment to provide satisfactory films and coatings than has been heretofore possible in water based compositions in which the organo-silica aerogel is not employed.

The coating compositions of this invention may also contain in addition to the various ingredients hereinbefore described additional ingredients commonly used in the preparation of latex coating compositions and paints. Such ingredients include water miscible organic solvents such as aliphatic alcohols, aliphatic glycols and the like and alkali metal phosphates particularly alkali metal tripolyphosphates to aid in the dispersion of the dispersed ingredients and to aid in preventing the settling of the dispersed ingredients from the formulations during storage.

The compositions of this invention may be prepared by intimately admixing with agitation an amount of any of the hereinbefore described finely divided organo-silica aerogels sufficient to prevent agglomeration or flocculation of the compositions during and after the application of such compositions to a surface to form a film or coating with any of the commercially available water based coating compositions or any of the coating compositions hereinbefore described. As previously described the amount of organo-silica aerogel so admixed is from between about 0.2% to about 2.0% and is preferably from about 0.4% to about 1.0%.

Although it is possible to admix the silica aerogel in the finished formulation it has been found advantageous to admix the organo-silica aerogel with other ingredients such as water and thickener prior to the incorporation of the finely divided polymer which is usually in the form of a dispersion containing from 40 to 60% by weight of the polymer. Generally, when the composition contains a pigment the organo-silica aerogel will be intimately admixed with water, an emulsifying agent, thickener, pigment and pigment extender prior to the incorporation of the polymer therein. By so proceeding a composition is obtained which has a storage qualities superior to previously known water based latex compositions in that the dispersed phase has significantly less tendency to settle out when stored under ordinary storage conditions in addition to providing a superior and more uniform coating.

The various ingredients of the compositions of this invention are mixed for a time sufficient to form a uniform dispersion of the dispersed materials in the aqueous media. This is generally accomplished by procedures and mixers well known to those skilled in the paint formulation art.

EXAMPLE I

A standard latex paint formulation was prepared as follows. To 200 grams of water there was added with agitation 2.15 grams of polyethylene glycol monolaurate, 7.05 grams of ethylene glycol, 6.4 grams of ethyl glycol ether, 5.8 grams of propylene glycol, 1.0 gram of potassium tripolyphosphate, 106 grams of finely divided titanium dioxide, 78 grams of calcium carbonate, 50 grams of calcined china clay, 2 grams of octyl alcohol and 3.25 grams of hydroxy ethyl cellulose. Agitation of the above mixture was continued for about 20 minutes until a smooth slurry was obtained. To this slurry there was added 126.75 grams of a commercial styrene butadiene latex containing 48% by weight of styrene butadiene copolymer suspended in water and 0.95 gram of a 6% solution of cobalt naphthenate. The latter mixture was added to the slurry slowly over a period of 10 minutes. The resulting mixture was a white water based latex paint and was set aside for evaluation as described in Example IV.

EXAMPLE II

The procedure of Example I was repeated except that 3.86 grams of a finely divided organo-silica aerogel having an $SiO_2$ to carbon ratio of 15:1 and an $SiO_2$ to hydrogen ratio of 1.1:1, an average particle size of 2.4 microns, an external surface area of 1.88 square meters per gram was added to the slurry. The resulting formulation was set aside for evaluation as described in Example IV.

EXAMPLE III

The procedure of Example II was repeated except that a vinyl acetate-dibutyl maleate copolymer latex containing 48% by weight of finely divided solid copolymer particles dispersed in water was added to the slurry. The resulting formulation was set aside for evaluation as described in Example IV.

EXAMPLE IV

The paint formulations prepared in Examples I through III were aged at room temperature for seven days, after which they were brushed on smooth black surfaces and evaluated for hiding power (e.g. opacity of film) and porosity. The formulation of Example I exhibited poor opacity that is the black surface underneath the paint coating was clearly visible indicating that substantial amounts of agglomeration or flocculation had occurred in the paint film during and after its application to the black surface. Films on the black surface formed from the application of the formulations of Examples II and III completely covered the black surfaces and were uniformly white throughout, indicating that little if any flocculation or agglomeration of the materials in the paint films had occurred during and after the application of the film to the black surface.

The resultant films were measured for porosity (by a process known in the art as enamel holdout) by applying over the paint coating an alkyd semi-gloss blue enamel, and then permitting the enamel coat to dry for 48 hours. The three samples were visually examined by holding the painted surfaces under a fairly strong light at a low angle. In this evaluation the coating having limited porosity will show a greater gloss of the enamel top coat when observed in this manner.

The coating formed from the formulation of Example I indicated significantly less gloss when evaluated by this procedure than the coatings formed from the formulations of Examples II and III.

When precipitated silica and inorganic silica aerogels were added to the formulations of the Examples II and III in place of the organo-silica aerogel employed the opacity or hiding power of the resultant coatings of such formulations was slightly better than the standard paint formulation of Example I but not nearly as opaque as the coatings formed by the formulations of Examples II and III. Evaluations of the formulations containing precipitated silica and inorganic silica aerogels for porosity using the enamel holdout technique showed better gloss than films formed from the formulations of Example I but significantly less gloss than films formed from the formulations of Examples II and III.

EXAMPLE V

A standard colorless water based latex formulation was prepared as follows. To 200 grams of water there was added with agitation 2.15 grams of polyethylene glycol monolaurate, 7.05 grams of ethylene glycol, 6.4 grams of carbitol, 5.8 grams of propylene glycol, 1 gram of potassium tripolyphosphate, 210 grams octyl alcohol and 3.25 grams of hydroxy ethylcellulose. The mixture was stirred until a clear solution was formed. To this solution there was added with continuing agitation 126.75 grams of a styrene butadiene latex consisting of 48% by weight of a finely divided commercial styrene butadiene copolymer suspended in styrene monomer. Stirring was continued for about 10 minutes and until a clear water based coating composition was formed. The coating composition was set aside for evaluation as described in Example VII.

EXAMPLE VI

The procedure of Example V was repeated except that 3.86 grams of a finely divided organo-silica aerogel having an $SiO_2$ to carbon ratio of 35:1 and an $SiO_2$ to hydrogen ratio of 1.9:1, an average particle size of 2.4 microns, an external surface area of 1.88 square meters per gram was added to the slurry. This formulation was permitted to age for seven days after which it was evaluated as described in Example VII.

EXAMPLE VII

The formulations of Examples V and VI were brushed on flat black surfaces and dried for 48 hours. Thereafter an alkyd resin blue enamel was applied to the coated surfaces and the resulting surfaces were observed for reflectance or gloss as described in Example IV to evaluate the relative porosity of the latex coating. The formulation of Example V exhibited poor gloss whereas the formulation of Example VI exhibited a high gloss. These observations indicated that the latex particles (e.g. polymer particles) had agglomerated or flocculated in the film formed from the formulation of Example V. In other words the film so formed was porous due to the agglomeration of the latex particles. On the other hand films formed in the formulation of Example VI which exhibited a high gloss were substantially non-porous due to the lack of agglomeration of the particles of the organo-silica aerogel containing formulations.

When precipitated silica or an inorganic silica aerogel was added to the formulation of Example VI and evaluated as above-described the enamel coated films exhibited a slightly better gloss than the films formed from the formulations of Example V but significantly less gloss than films formed from the formulation of Example VI.

What is claimed is:

1. A film forming composition comprising an aqueous medium having dispersed therein a finely divided water insoluble organic polymer and an amount, sufficient to maintain said finely divided polymer in a dispersed state during and after the application of said composition to a surface to form a film, of a finely divided amorphous organo-silica aerogel comprising a silica polymer having siloxy groups and containing carbon and hydrogen atoms chemically bound to a portion of the siloxy groups in said aerogel, said aerogel being further characterized in having an $SiO_2$ to carbon atom ratio of from about 10:1 to about 50:1 and an $SiO_2$ to hydrogen atom ratio of from about 0.77:1 to about 2:1, said aerogel being present in an amount of from about 0.2% to about 2.0% by weight, based on the total weight of the composition.

2. A composition as in claim 1, wherein the finely divided amorphous organo-silica aerogel comprises a silica polymer having siloxy groups and containing carbon and hydrogen atoms chemically bound to a portion of the siloxy groups in said aerogel and is characterized in having a specific surface area of from about 100 to about 400 square meters per gram, an external surface area of from about 1.75 to about 1.95 square meters per gram, an average particle size in the range of from about 1.0 to about 2.5 microns and containing from about 0.9% to about 1.2% by weight of carbon and from about 1.2% to about 1.5% by weight of hydrogen and is further characterized in having an $SiO_2$ to carbon atom ratio of from about 10:1 to about 25:1 and an $SiO_2$ to hydrogen atom ratio of from about 0.77:1 to about 1.3:1.

3. A composition as in claim 1, wherein the finely divided amorphous organo-silica aerogel comprises a silica polymer having siloxy groups and containing carbon and hydrogen atoms chemically bound to a portion of the siloxy groups, said aerogel being characterized in having a specific surface area of from about 250 to about 350 square meters per gram, an external surface area of from about 1.75 to about 1.95 square meters per gram and an average particle size in the range of from about 1.0 to about 2.5 microns, said aerogel being further characterized in having an $SiO_2$ to carbon atom ratio of from about 25:1 to about 50:1 and an $SiO_2$ to hydrogen atom ratio of from about 1.3:1 to about 2:1.

4. A film forming composition comprising an aqueous medium having dispersed therein a finely divided water insoluble organic polymer, a finely divided pigment and an amount, sufficient to maintain said polymer and said pigment in a finely divided dispersed state during and after the application of said composition to a surface to form a uniform film, of a finely divided amorphous organo-silica aerogel comprising a silica polymer having siloxy groups and containing carbon and hydrogen atoms chemically bound to a portion of the siloxy groups in said aerogel, said aerogel being further characterized in having an average particle size in the range of from about 1.0 to about 2.5 microns and containing from about 0.4% to about 1.2% by weight of carbon from about 0.9% to about 1.5% by weight of hydrogen and in having an $SiO_2$ to carbon atom ratio of from about 10:1 to about 50:1 and an $SiO_2$ to hydrogen atom ratio of from about 0.77:1 to about 2:1, said aerogel being present in an amount of from about 0.2% to about 2.0% by weight, based on the total weight of the composition.

5. A water based latex paint comprising an aqueous medium having dissolved therein an emulsifying agent and a thickener and having dispersed therein a finely divided water insoluble organic polymer, a finely divided water insoluble inorganic pigment and from about 0.2% to about 2.0% by weight of a finely divided amorphous organo-silica polymer having siloxy groups and containing carbon and hydrogen atoms chemically bound to a portion of the siloxy groups in said aerogel, said aerogel being further characterized in having an average particle size in the range of from about 1.0 to about 2.5 microns and containing from about 0.4% to about 1.2% by weight of carbon, from about 0.9% to about 1.5% by weight of hydrogen and in having an $SiO_2$ to carbon atom ratio of from about 10:1 to about 50:1 and an $SiO_2$ to hydrogen atom ratio of from about 0.77:1 to about 2:1.

6. A water based latex paint comprising an aqueous medium having dissolved therein an emulsifying agent and a thickening agent and having dispersed therein a finely divided water insoluble organic polymer, a finely divided, water insoluble inorganic pigment, a pigment extender and from about 0.2 to 2.0% by weight of a finely divided amorphous organo-silica aerogel characterized in having a specific surface area of from about 100 to about 400 square meters per gram, an external surface area of from about 1.75 to about 1.95 square meters per gram, an average particle size in the range of from about 1.0 to about 2.5 microns and containing from about 0.9% to about 1.2% by weight of carbon, from about 1.2% to about 1.5% by weight of hydrogen and being further characterized in having an $SiO_2$ to carbon atom ratio of from about 10:1 to about 25:1 and an $SiO_2$ to hydrogen atom ratio of from about 0.77:1 to about 1.3:1.

References Cited

UNITED STATES PATENTS

| | | | |
|---|---|---|---|
| 2,989,412 | 6/1961 | Koehler et al. | 260—46.5 |
| 3,061,567 | 10/1962 | Keil | 260—46.5 |
| 3,131,148 | 4/1964 | Taulli | 23—182 |
| 3,210,273 | 10/1965 | Taulli | 252—28 |

FOREIGN PATENTS 806,556 12/1958 Great Britain.

WILLIAM H. SHORT, *Primary Examiner.*

E. M. WOODBERRY, *Assistant Examiner.*